United States Patent [19]

Rinkes et al.

[11] 4,246,432
[45] Jan. 20, 1981

[54] METHOD AND APPARATUS FOR MELTING FRITS FOR INORGANIC OXIDIC SURFACE COATINGS BY ELECTRIC RESISTANCE HEATING

[75] Inventors: Hans Rinkes; Werner Joseph, both of Cologne, Fed. Rep. of Germany

[73] Assignee: Bayer Aktiengesellschaft, Leverkusen, Fed. Rep. of Germany

[21] Appl. No.: 960,335

[22] Filed: Nov. 13, 1978

[30] Foreign Application Priority Data

Nov. 30, 1977 [DE] Fed. Rep. of Germany ....... 2753351

[51] Int. Cl.³ .............................................. C03B 5/02
[52] U.S. Cl. ......................................................... 13/6
[58] Field of Search ....................................... 13/6, 23

[56] References Cited

U.S. PATENT DOCUMENTS 2,559,683  7/1951  Skinner et al. ............................. 13/6
3,885,945  5/1975  Rees et al. ............................. 13/6 X Primary Examiner—Roy N. Envall, Jr.

Attorney, Agent, or Firm—Sprung, Felfe, Horn, Lynch & Kramer

[57] ABSTRACT

An electric furnace for the continuous melting of frits for inorganic oxidic surface coatings, comprising a substantially rectangular melting chamber, a working chamber separated from the melting chamber by an immersion dam, means for the introduction of raw materials to the melting chamber, and electrodes within the melting chamber for the transmission of electrical energy to the melt, the ratio of the effective electrode surface area to the area of the bottom of the melting chamber being less than about 0.1. Advantageously the supply of energy to the electrodes is regulated by supplying a constant current with a constant output stream, the surface of the melt is covered with about 1 to 10 mm of unmelted frit, the average dwell time of the melt in the furnace is from about 3 to 6 hours, the frit is free from nitrates, the melt is about 5 to 20 cm deep and the frit is introduced thereto from a height at least 50 cm above the level of the melt.

4 Claims, 5 Drawing Figures

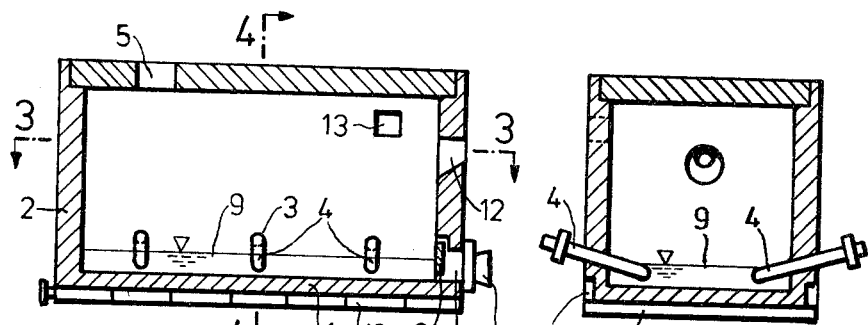
FIG. 2
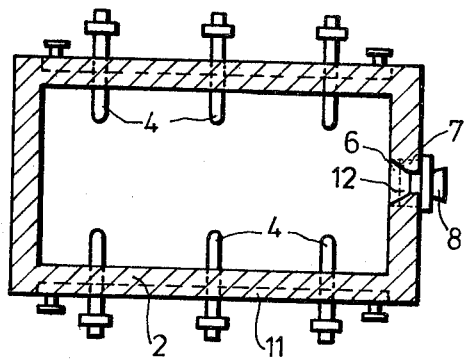
FIG. 4
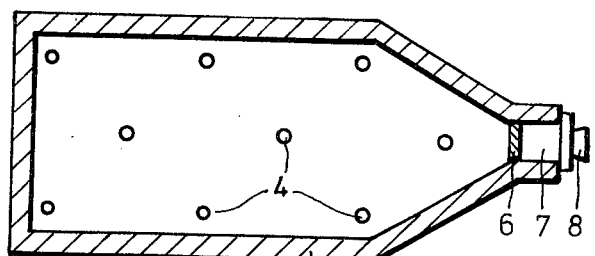
FIG. 3
FIG. 5

METHOD AND APPARATUS FOR MELTING FRITS FOR INORGANIC OXIDIC SURFACE COATINGS BY ELECTRIC RESISTANCE HEATING

The use of electrical energy for melting glass is already known in the art. A glass melt is an ionic conductor. An electric field is produced in the melt by means of electrodes and the energy is made available for melting the glass as Joule's heat by virtue of its finite conductivity. In contrast to flame heated glass melting furnaces, in which the heat must be transmitted to the melt over the surface of the bath, in electric furnaces the heat is produced directly in the melt, so than electrically heated furnaces can be operated much more economically as regards the consumption of energy that can flame heated furnaces. Another disadvantage of flame heated furnaces is the expense involved in the purification of the exhaust gas from the flame gases which, moreover, carry with them volatile constituents of the glass melt and solid constituents in the form of dust. The amount of waste gas produced in electric furnaces, on the other hand, is minimal.

The main advantage of electric furnaces for melting glass, however, is that the clarification and homogenization of the glass melt are considerably improved.

For the production of frits for inorganic oxidic coating materials, on the other hand, electric furnaces have hitherto not been used, although frits and glass are produced by melting substantially the same raw materials.

Those properties of electric melting furnaces which are particularly suitable for the clarification and homogenization of glass melts are precisely those which render these furnaces unsuitable for melting frits. In the case of glass, it is desired to achieve complete melting of the raw materials followed by clarification and homogenization in order to obtain a homogeneous glass phase, whereas when melting frits for inorganic oxidic surface coatings the melting process should be incomplete in order to obtain a certain partial crystallinity to provide nuclei for partial recrystallization on cooling. As is well known, such nuclei are necessary inhomogeneities for producing a definite recrystallization to render enamel or ceramic frits opaque when they are applied as melts on metal or ceramic substrates.

It is an object of the present invention to provide a method and an apparatus for melting frits for inorganic oxidic surface coatings using electrical energy.

The present invention therefore relates to an electric furnace for the continuous melting of frits for inorganic oxidic surface coatings, consisting of a substantially rectangular melting chamber, a working chamber separated from said melting chamber by an immersion dam, a device for introducing the raw materials, and electrodes for the transmission of electrical energy to the melt, in which the ratio of effective electrode surface to the surface of the bath in the melting chamber is less than about 0.1.

"Effective electrode surface" means, in the context of this invention, the sum of electrode surfaces in projection perpendicular to the surface of the bath of melt. If the electrodes are immersed vertically in the melt, the "effective electrode surface" is the sum of the surfaces of the electrodes. If the electrodes are introduced horizontally into the melt, the "effective electrode surface" is twice the sum of the vertical cross-sectional surface areas in the longitudinal direction through the electrodes. In other words, the effective electrode surface is the total surface area through which the lines of force which are parallel to the surface of the melting bath emerge perpendicularly out of the electrodes.

The ratio of effective electrode surface to the surface area of the bottom of the melting chamber is preferably from about 0.04 to 0.08.

According to the invention, the depth of the melting bath is between about 5 and 20 cm, preferably between about 10 and 18 cm. The electrodes are supplied with alternating current at the mains frequency, and a three-phase current supply is preferably used.

The number of electrodes is therefore preferably one which is divisible by three. The electrode furnace preferably contains six or nine electrodes. Preferably the electrodes are made of pure iron, molybdenum or tin oxide. They may be introduced into the melt either vertically through the bottom of the furnace or horizontally through the side walls. They are preferably introduced generally horizontally through the side walls at such an angle to the vertical that the opening in the side wall for introduction of the electrodes lies above the level of the melt in the furnace on the external surface of the side wall. This arrangement facilitates replacement of the electrodes for repair or in the case of destruction of the electrodes without the melt flowing through the opening for the electrodes.

The immersion dam prevents non-molten particles of raw material floating on the surface of the melt from entering the working chamber and being separated thereby from the discharged stream of molten frit.

According to the invention, the working chamber is very small in proportion to the melting chamber in order to maintain the ability of the melt to develop the opacity. The ratio of the horizontal cross-sectional area of the bath of melt in the melting chamber to that in the working chamber should be greater than about 50, preferably greater than about 80. In furnaces which have a high melting capacity, this ratio may exceed 200.

The device for introducing the raw materials should according to the invention lie at least about 50 cm above the level of the melting bath. The raw materials may be introduced through conveyor screws opening into the rear wall of the furnace. The raw materials should trickle loosely over the surface of the melting bath so that they encounter as large as possible a surface area of the bath. The opening for introduction of a batch of raw material is preferably situated in the dome of the furnace to ensure that the material can trickle from the greatest possible height and hence be widely scattered over the surface of the bath. The opening in the dome should be situated near the rear wall of the furnace, preferably removed from this wall by about 1/5th of the length of the melting chamber.

Additional flame heating is provided for starting the electric furnace because the raw materials generally do not conduct the electric current before they have melted. Flame heating is stopped as soon as the melt is sufficiently conductive for the supply of electrical energy.

The electric furnace according to the invention is described in more detail below with reference to the drawings wherein:

FIG. 2 is a vertical section through an electric furnace with a preferred arrangement of electrodes and the opening for the supply of raw materials situated in the dome.

FIG. 3 is a section on the line 3—3 through the furnace of FIG. 2.

FIG. 4 is a section on the line 4—4 through the furnace of FIG. 2.

FIG. 5 is a horizontal section through a furnace showing the cross-section tapering towards the discharge end.

Figure 1:
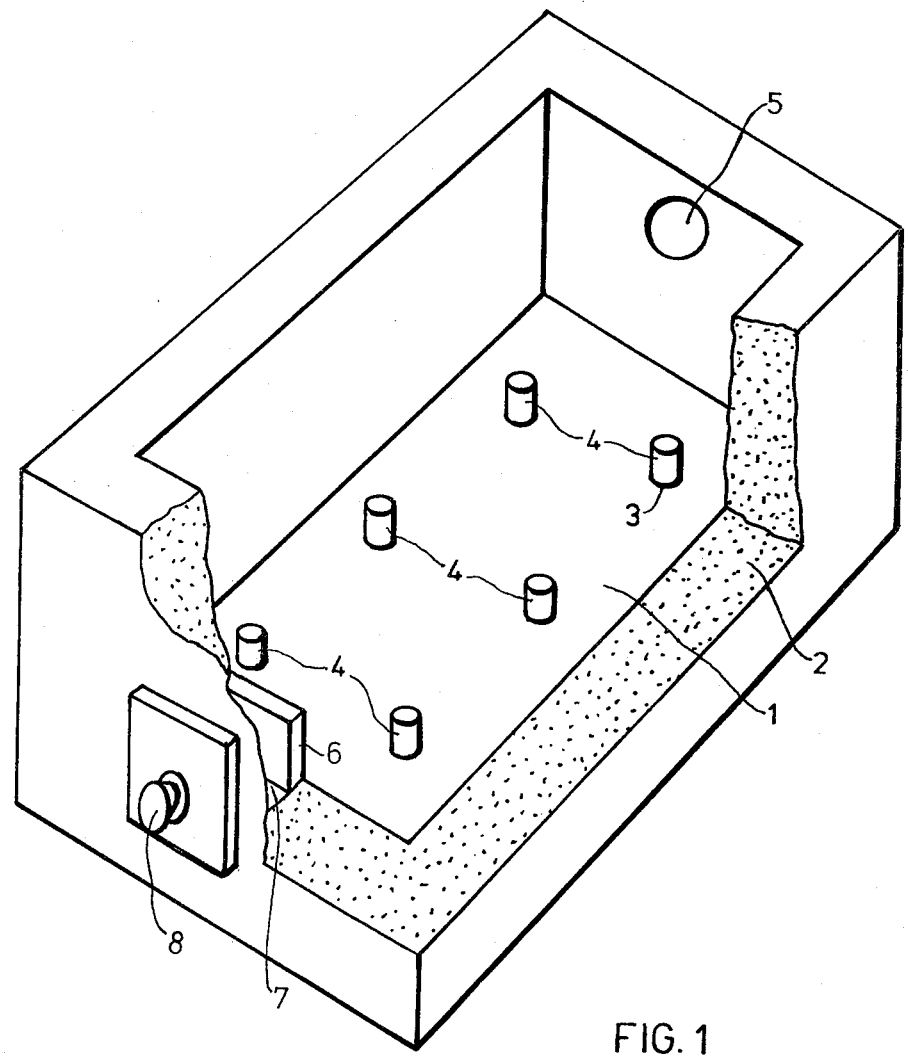
FIG. 1 is a view in perspective of the electric furnace according to the invention with electrodes introduced vertically into the melt.

The reference numerals in the figures have the following meaning:
1—Bottom wall of furnace
2—Side wall of furnace
3—Opening for electrodes
4—Electrode
5—Opening for introduction of raw materials
6—Immersion dam
7—Working chamber
8—Outlet opening for the melt
9—Surface of molten bath
10—Cooling means for bottom of furnace
11—Side wall cooling
12—Opening for flame heating
13—Outlet for flue gas The invention also relates to a process for melting frits for inorganic oxidic surface coatings, using the electric furnace according to the invention in which electrical energy is supplied to the melt by electrodes.

The raw material is preferably fed into the furnace in such a manner that the entire surface of the molten bath is covered with unmelted raw materials. This layer of unmelted raw material covering the surface of the bath should preferably have a thickness of about 1 to 10 mm, more preferably about 3 to 5 mm. This is ensured by scattering the raw material over as large a surface area of the bath as possible. A sufficient quantity of unmelted raw material on the surface of the bath is also ensured by regulating the output stream and the supply of electrical energy. This regulation is preferably achieved by supplying a constant current at constant output stream. By virtue of the temperature characteristic of the resistance of ionic conductors, a self regulating system is thereby obtained since the resistance increases with decreasing temperature so that, if the current is constant, the amount of energy supplied is increased whereas if the temperature rises the resistance falls so that the quantity of electrical energy supplied also diminishes.

The average dwell time of the melt in the furnace is preferably from about 3 to 6 hours.

It has been found that frits of excellent quality for inorganic oxidic surface coatings with very little variation in the properties of the resulting frits can be melted by the melting process according to the invention. In particular, frits with very little fluctuation in the preliminary clouding can be obtained so that very great consistency of clouding and uniformity of color can be obtained, particularly in the case of titanium-clouded frits and among these particularly the colored frits. It has also been found that the molten frits according to the invention are superior to frits melted in flame heated furnaces as regards fluctuations in their thermal coefficients of expansion and their flow characteristics.

It has surprisingly also been found that the supply of oxygen carriers which is generally necessary in flame heated frit melting in unnecessary in the process according to the invention. The oxygen carriers used in flame heated furnaces are nitrate raw materials or peroxides. On account of the need for exhaust gas cleaning when using raw materials containing nitrates, it is preferred in the invention to use nitrate-free raw materials without these having to be replaced by the more expensive peroxides as oxygen carriers.

It has surprisingly also been found that titanium white enamel can be melted without discoloration even when pure iron electrodes are used. It is well known that in the case of titanium white enamel, iron contents and concentrations of as little as $10^{-2}\%$ are sufficient to cause discoloration.

Further advantages of the process according to the invention arise from the fact that the loss of volatile constituents of the melt such as fluorine, boron and alkali which occur in flame heated furnaces do not now occur. In addition to the saving in raw materials, this therefore also leads to a considerable reduction in the expense of exhaust gas cleaning.

All types of inorganic oxidic frits for surface coatings can be melted by the process according to the invention. In particular, it has been found that even in the case of lead silicate frits no reduction to metallic lead is observed at a mains frequency of 50 Hz.

It will be appreciated that the instant specification and examples are set forth by way of illustration and not limitation, and that various modifications and changes may be made without departing from the spirit and scope of the present invention.

What is claimed is:

1. An electric furnace for the continuous melting of frits for inorganic oxidic surface coatings, comprising a substantially rectangular melting chamber, a working chamber separated from the melting chamber by an immersion dam, the ratio of the horizontal cross-sectional area of the molten bath in the melting chamber to the working chamber being greater than about 50, means for the introduction of raw materials to the melting chamber positioned at least 50 cm above the level of the melt, electrodes within the melting chamber for the transmission of electrical energy to the melt, the ratio of the effective electrode surface area to the area of the bottom of the melting chamber being less than about 0.1, and an outlet opening for the melt from the working chamber positioned to provide a molten bath from about 5 to 20 cm in height.

2. An electric furnace according to claim 1, in which the ratio is from about 0.04 to 0.08.

3. An electric furnace according to claim 1, including a dome for the melting chamber, the dome having an opening for discharge of raw materials, the opening being at a distance from the rear wall of the furnace of about 1/5th of the length of the melting chamber.

4. An electric furnace according to claim 3, in which the ratio of the effective electrode surface area to the area of the bottom of the melting chamber is from about 0.04 to 0.08, the molten bath is about 10 to 18 cm deep, and the ratio of the horizontal cross-sectional area of the molten bath in the melting chamber to the working chamber is greater than about 80.

* * * * *